United States Patent [19]

Okada et al.

[11] Patent Number: 5,519,068

[45] Date of Patent: *May 21, 1996

[54] METHOD OF PRODUCING OPEN CELL RIGID POLYURETHANE FOAM

[75] Inventors: Kazuo Okada, Toyonaka; Yoshihiko Tairaka, Sakai, both of Japan

[73] Assignee: Takeda Chemical Industries, Ltd., Osaka, Japan

[*] Notice: The term of this patent shall not extend beyond the expiration date of Pat. No. 5,318,997.

[21] Appl. No.: 233,445

[22] Filed: Apr. 26, 1994

[30] Foreign Application Priority Data

Apr. 26, 1993 [JP] Japan .................. 5-099234

[51] Int. Cl.⁶ .................................. G08G 18/48
[52] U.S. Cl. .................... 521/174; 521/117; 521/128
[58] Field of Search ................... 521/174, 117, 521/128

[56] References Cited

U.S. PATENT DOCUMENTS 5,063,253  11/1991  Gansen et al. .................. 521/174
5,306,737  4/1994  Burkhart et al. ................ 521/174
5,318,997  6/1994  Okada et al. ................... 521/155

FOREIGN PATENT DOCUMENTS 0339848  11/1989  European Pat. Off. .
0567027  10/1993  European Pat. Off. .
1457824   9/1966  France .
2231704  12/1974  France .

*Primary Examiner*—Morton Foelak
*Attorney, Agent, or Firm*—Wenderoth, Lind & Ponack

[57] ABSTRACT

There is provided a method of producing an open cell rigid polyurethane foam which comprises reacting a specified polyol mixture by use of water as the substantially sole blowing agent without the use of a volatile hlorofluorocarbon as a blowing agent. There is provided a further method of producing an open cell rigid polyurethane foam particularly suitable for use as a shock absorbing material which comprises reacting a specified polyol/monool mixture. Water is used in an amount of 0.5–5.5 parts by weight in relation to 100 parts by weight of the polyol mixture or polyol/monool mixture used.

22 Claims, 4 Drawing Sheets

METHOD OF PRODUCING OPEN CELL RIGID POLYURETHANE FOAM

FIELD OF THE INVENTION

This invention relates to a method of producing an open cell rigid polyurethane foam suitable for use as a heat insulating material, structural material or shock absorbing material.

BACKGROUND OF THE INVENTION

A rigid polyurethane foam has an excellent moldability and processability, and is in wide use as a heat insulating material, structural material or shock absorbing material.

In general, a rigid polyurethane foam has closed cells in which such a gas as a volatile chlorofluorocarbon, e.g., trichlorofluoromethane (R-11), or carbon dioxide is enclosed. The gas has a small heat conductivity so that a closed cell rigid polyurethane foam has a high heat insulating performance, and hence is in wide use as a heat insulating material. On the other hand, a rigid polyurethane foam for use as a structural material does not need a high heat insulating performance. Nevertheless, such a volatile chlorofluorocarbon as trichlorofluoromethane is usually used as a blowing agent for the production of a rigid polyurethane foam for use as a structural material since it is inexpensive and easy to handle.

The conventional chlorofluorocarbons exemplified by trichlorofluoromethane are chemically stable so that they diffuse into the stratosphere to destroy the ozone layer. As a result, the solar ultraviolet radiation is not absorbed by the ozone layer, but it reaches the surface of the earth, and is causing a global environmental problem. For this reason, the use of trichlorofluoromethane has been limited since 1989, and the use of trichlorofluoromethane for the production of polyurethane foam as well.

It is of course possible to use a closed cell rigid foam as a structural rigid foam. However, as set forth above, the closed cell foam is produced while it contains a gas in the cells, so that it is necessary to employ a jig having a strength sufficient to withstand a large foaming pressure when the foam is produced. Moreover, the closed cell foam has not a sufficient dimensional stability, in particular, a thermal dimensional stability.

Therefore, there is no need to use a closed cell rigid foam as a structural material where a high heat insulating performance is not necessary. Nevertheless, a closed cell rigid foam has been in fact used as a structural material on account of the difficulty of producing an open cell rigid polyurethane foam having a relatively high mechanical strength without the use of chlorofluorocarbons or freons as a blowing agent. When water is used as a blowing agent, a closed cell rigid polyurethane foam is readily produced since an organic polyisocyanate compound reacts with water to form urea bonds to crosslink the molecular chains while producing carbon dioxide.

Under these circumstances, there have been proposed a variety of methods in which a cell opening agent is used, as disclosed in, for example, Japanese Patent Application Laid-open No. 63-89519 or No. 61-51021. According to the method, an open cell foam is obtained by use of trichlorofluoromethane as a blowing agent, however, the trichlorofluoromethane is released into the air when a foam is produced, with a result that such a gas might cause an environmental contamination. In addition, such release of gas is disadvantageous from the economical standpoint.

In the meantime, the use of a shock absorbing material has started in recent years as one of the safety measures for motor driving to absorb a shock when an automobile collision occurs. It is already known that a rigid polyurethane foam having open cells and a large cell size is suitably used as such a shock absorbing material, as disclosed in, for example, Japanese Patent Publication No. 54-4027 or No. 52-34678. Thus, the use of an open cell rigid polyurethane foam as a shock absorbing material has become important in recent years among the many uses of structural materials.

As an open cell rigid polyurethane foam for use as a shock absorbing material needs no high heat insulating performance, it is desirable not to use a chlorofluorocarbon as a blowing agent. However, as set forth hereinbefore, it is usually difficult to produce an open cell rigid polyurethane foam without the use of chlorofluorocarbon as a blowing agent, still more a foam for use as a shock absorbing material.

In general, a shock absorbing material is used to absorb and relieve a shock, and accordingly it is important that a shock absorbing material has a high effective compressibility. FIG. 1 is a simplified graph to illustrate the relationship between compressibility and compressive stress of a rigid polyurethane foam under a static compression test, in which the line A–B indicates a compressive strength, and the compressibility at a point B indicates an effective compressibility. The amount of absorbed energy by a shock absorbing material is shown by a shaded region in FIG. 1. It is necessary that a shock absorbing material has a thickness as small as possible if resident space should be large, as the case with an automobile, and therefore, it is necessary that a shock absorbing material has a large effective compressibility as well as a large compressive strength.

The point B appears around a compressibility of 30–50% with regard to a usual rigid polyurethane foam. However, it is desirable that a rigid polyurethane foam has an effective compressibility of at least 70%, and preferably at least 80%, so that it is suitably used as a shock absorbing material. It is also necessary that a rigid polyurethane foam breaks into pieces, preferably into powder, when a shock is given thereto so that the foam has a high effective compressibility, as disclosed in, for example, Japanese Patent Publication No. 54-4027.

BRIEF SUMMARY OF THE INVENTION

It is, therefore, an object of the invention to provide a method of producing an open cell rigid polyurethane foam suitable for general use such as a heat insulating material, structural material or shock absorbing material by use of water as the substantially sole blowing agent.

It is a further object of the invention to provide a method of producing an open cell rigid polyurethane foam particularly suitable for use as a shock absorbing material by use of water as the substantially sole blowing agent.

Figure 2:
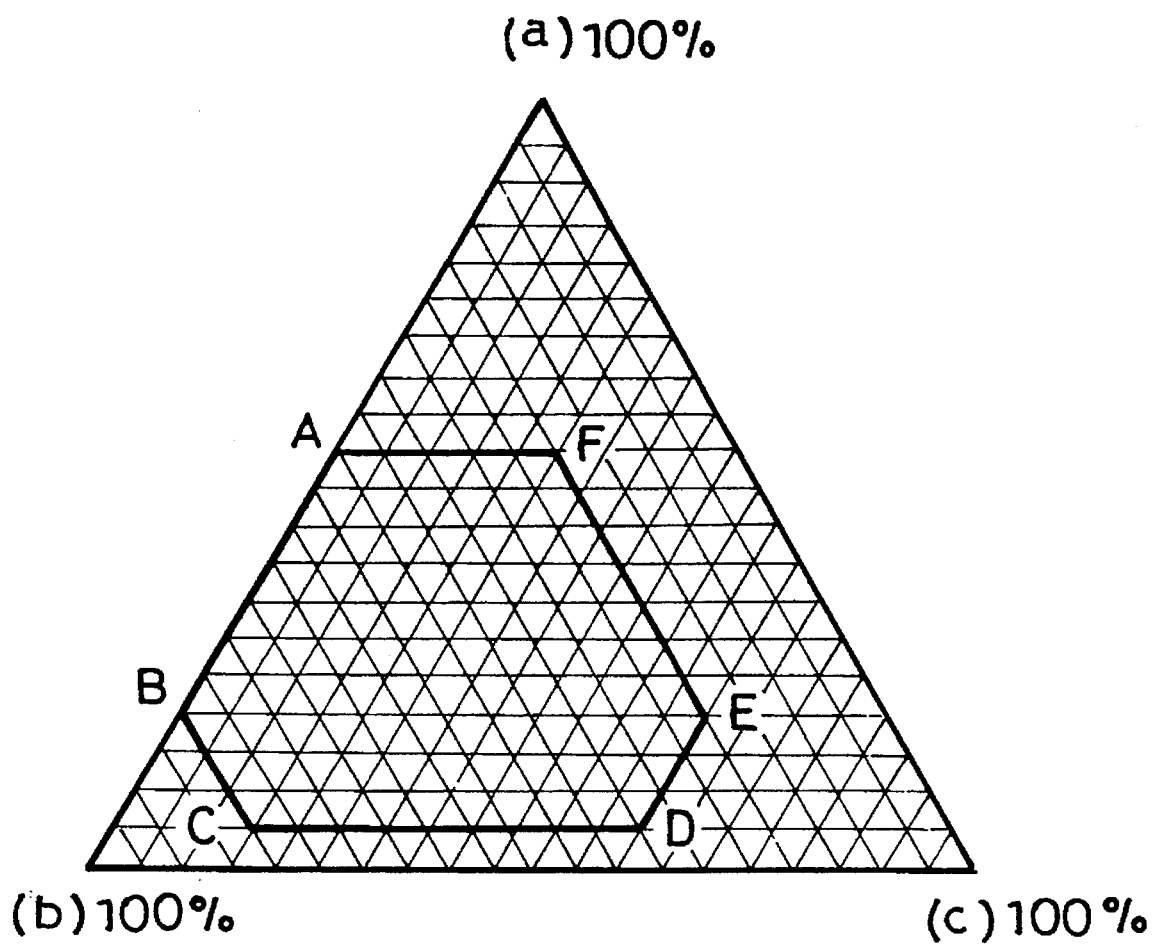
FIG. 2 is a triangular diagram on which a region of weight proportion coordinates of polyols used according to the invention for the production of an open cell rigid polyurethane foam are indicated.

According to the invention, there is provided a method of producing an open cell rigid polyurethane foam which comprises reacting a polyol mixture which comprises:

(a) 5–55% by weight of a first polyoxyalkylene polyol having an average functionality of 2–3.5, a hydroxyl value of 25–60 mg KOH/g, an oxyethylene unit content of not more than 5% by weight based on the first polyoxyalkylene polyol and a primary hydroxyl group content of not more than 5% based on the total of the hydroxyl groups of the first polyoxyalkylene polyol;

(b) 20–80% by weight of a second polyoxyalkylene polyol prepared by use of a polyfunctional amine compound as an initiator, having an average functionality of 3–5, a hydroxyl value of 150–800 mg KOH/g, and a primary hydroxyl group content of not more than 5% based on the total of the hydroxyl groups of the second polyoxyalkylene polyol; and (c) 0–60% by weight of a third polyoxyalkylene polyol other than the second polyoxyalkylene polyol, and having an average functionality of 2–6 and a hydroxyl value of 200–900 mg KOH/g;

wherein the weight proportion coordinates of the polyols (a), (b) and (c) on a triangular diagram are either on the sides of a hexagon formed by connecting six points A, B, C, D, E and F with straight lines or within the hexagon, as illustrated in FIG. 2; and which has a hydroxyl value of 200–600 mg KOH/g, with an organic polyisocyanate at an isocyanate index of 70–150 in the presence of water as a blowing agent in an amount of 0.5–5.5 parts by weight in relation to 100 parts by weight of the polyol mixture.

Figure 3:
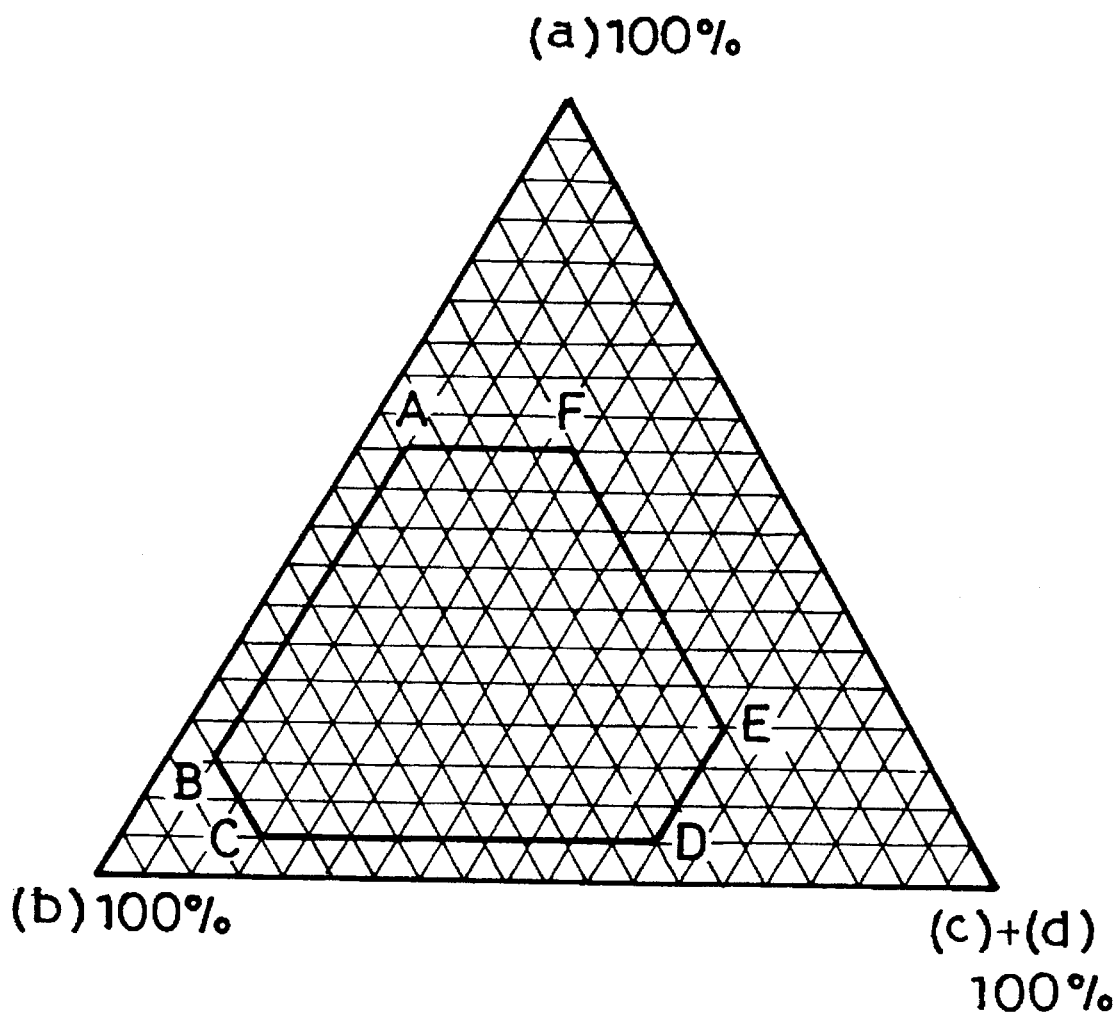
FIG. 3 is a triangular diagram on which a region of weight proportion coordinates of polyols and monools used according to the invention for the production of an open cell rigid polyurethane foam suiable for use as a shock absorbing material are indicated.

Further according to the invention, there is provided a method of producing an open cell rigid polyurethane foam particularly suitable for use as a shock absorbing material. The method comprises reacting a polyol/monool mixture which comprises:

(a) 5–55% by weight of a first polyoxyalkylene polyol having an average functionality of 2–3.5, a hydroxyl value of 25–60 mg KOH/g, an oxyethylene unit content of not more than 5% by weight based on the first polyoxyalkylene polyol and a primary hydroxyl group content of not more than 5% based on the total of the hydroxyl groups of the first polyoxyalkylene polyol;

(b) 20–80% by weight of a second polyoxyalkylene polyol prepared by use of a polyfunctional amine compound as an initiator, having an average functionality of 3–5, a hydroxyl value of 150–800 mg KOH/g, and a primary hydroxyl group content of not more than 5% based on the total of the hydroxyl groups of the second polyoxyalkylene polyol;

(c) 0–55% by weight of a third polyoxyalkylene polyol other than the second polyoxyalkylene polyol, having an average functionality of 2–6 and a hydroxyl value of 200–900 mg KOH/g; and (d) 5–25% by weight of a monool having a hydroxyl value of 400–1800 mg KOH/g;

wherein the total of the third polyoxyalkylene polyol (c) and the monool (d) is in the range of 5–60% by weight based on the mixture of polyol/monool; and wherein the weight proportion coordinates of the polyols and monools (a), (b) and, (c)+(d) on a triangular diagram are either on the sides of a hexagon formed by connecting six points A, B, C, D, E and F with straight lines or within the hexagon, as illustrated in FIG. 3; and which has a hydroxyl value of 200–600 mg KOH/g, with an organic polyisocyanate at an isocyanate index of 70–150 in the presence of water as a blowing agent in an amount of 0.5–5.5 parts by weight in relation to 100 parts by weight of the polyol/monool mixture.

DETAILED DESCRIPTION OF THE INVENTION

The open cell rigid polyurethane foam is defined in the invention as an open cell rigid polyurethane foam having a closed cell content of not more than 10%.

The isocyanate index is defined as a value of [actual amount of polyisocyanate used/calculated amount of polyisocyanate required for the reaction with active hydrogens of hydroxyl compound such as polyols, monools and water]× 100.

The polyol mixture used in the invention comprises a first polyoxyalkylene polyol (a) and a second polyoxyalkylene polyol (b), and optionally a third polyoxyalkylene polyol (c), of which the weight proportion coordinates on a triangular diagram or coordinate are either on the sides of a hexagon formed by connecting six points A, B, C, D, E and F with straight lines or within the hexagon, as illustrated in FIG. 2, and which has a hydroxyl value of 200–600 mg KOH/g.

For the production of an open cell rigid polyurethane foam particularly suitable for use as a shock absorbing material, a polyol/monool mixture is preferably used which comprises a monool (d) in addition to the polyols (a) and (b) (and optionally (c)), wherein the total amount of the polyol (c) and the monool (d) is in the range of 5–60% by weight based on the polyol/monool mixture and wherein the weight proportion coordinates of the polyols and monools used on a triangular diagram are either on the sides of a hexagon formed by connecting six points A, B, C, D, E and F with straight lines or within the hexagon, as illustrated in FIG. 3. It is further preferred that the polyol/monool mixture has a hydroxyl value of 200–600 mg KOH/g.

According to the method of the invention, the reaction of the polyol mixture as mentioned above with an organic polyisocyanate by use of a blowing agent consisting essentially of water provides an open cell rigid polyurethane foam suitable for use as a heat insulating material, structural material or shock absorbing material. The use of the polyol/monool mixture as mentioned above provides an open cell rigid polyurethane foam particularly suitable for use as a shock absorbing material.

The first polyoxyalkylene polyol (a) has an average functionality of 2–3.5, a hydroxyl value of 25–60 mg KOH/g, preferably 28–45 mg KOH/g, an oxyethylene unit content of not more than 5% by weight based on the first polyoxyalkylene polyol and a primary hydroxyl group content of not more than 5% based on the total of the hydroxyl groups of the first polyoxyalkylene polyol.

The first polyoxyalkylene polyol (a) may be produced by addition polymerization of an alkylene oxide such as propylene oxide with a polyhydric alcohol having a functionality of 2–3.5 as an initiator so as to provide a polyol having a hydroxyl value in the range of 25–60 mg KOH/g. It is necessary that the first polyoxyalkylene polyol (a) has an oxyethylene unit content of not more than 5% by weight, and a primary hydroxyl group content of not more than 5% based on the total of the hydroxyl groups of the first polyoxyalkylene polyol. The first polyoxyalkylene polyol (a) may be used singly or as a mixture.

The polyhydric alcohol having a functionality of 2–3.5 may be one or a mixture of such a polyhydric alcohol having a functionality of two or three as propylene glycol, dipropylene glycol, glycerine or trimethylolpropane. The polyhydric alcohol having a functionality of 2–3.5 may also be obtained by admixing such a polyhydric alcohol having a functionality of two or three as mentioned above with such a polyhydric alcohol having a functionality of four or more as pentaerythritol, diglycerine, methyl glucoside, sorbitol or glucose so that the resultant mixture has an average functionality of not more than 3.5.

The use of such a first polyoxyalkylene polyol (a) as has a hydroxyl value of more than 60 mg KOH/g, or an oxyethylene unit content of more than 5% by weight, or a primary hydroxyl group content of more than 5% based on the total of the hydroxyl groups of the first polyol, does not provide an excellent open cell rigid polyurethane foam. The production of a polyoxyalkylene polyol having a hydroxyl value of less than 25 mg KOH/g may be practically difficult.

The polyol mixture used in the invention contains the first polyoxyalkylene polyol (a) in an amount of 5–55%, preferably 15–50% by weight. When the polyol mixture contains the first polyol (a) in an amount of less than 5% by weight, the resultant rigid foam has no excellent open cells. However, when the polyol mixture contains the first polyol (a) in an amount of more than 55% by weight, the resultant foam may have a strength insufficient for use as a structural material. As a further disadvantage, when the polyol mixture is used as a premix, there may take place separation between the individual polyols used.

The second polyoxyalkylene polyol (b) is prepared by addition polymerization of an alkylene oxide preferably such as propylene oxide with an organic polyfunctional amine compound having at least two active hydrogens derived from amino groups and at least one active hydrogen derived from hydroxyl groups, or having at least three active hydrogens derived from amino groups, and hence having a functionality of 3–5 as an initiator so as to provide a polyol having a hydroxyl value in the range of 150–800 mg KOH/g, preferably in the range of 200–550 mg KOH/g.

It is further necessary that the second polyoxyalkylene polyol (b) has a primary hydroxyl group content of not more than 5% based on the total of the hydroxyl groups of the second polyoxyalkylene polyol.

The polyfunctional amine compound may be exemplified by a (poly)alkylene polyamine, an alkanolamine or an aromatic polyfunctional amine which has at least two amino groups in the molecule. The (poly)alkylene polyamine includes, for example, ethylenediamine or diethylenetriamine. The alkanolamine includes, for example, monoethanolamine, diethanolamine, triethanolamine or isopropanolamine. The aromatic polyfunctional amine includes, for example, tolylenediamines (such as 2,4/2,6- or 2,3/3,4-tolylenediaminene), diaminodiphenylmethanes or polymethylene polyphenyl polyamines. There may be further mentioned as the polyfunctional amine compound, for example, a cycloaliphatic amine such as aminoethylpiperazines. Among the above mentined, however, ethylenediamine or tolylenediamines are preferred.

The use of such a second polyoxyalkylene polyol (b) as has a hydroxyl value of not more than 150 mg KOH/g provides a rigid foam unsuitable for use as a structural material on account of insufficient mechanical strength. The use of such a second polyol (b) as has a hydroxyl value of more than 800 mg KOH/g usually fails to provide an open cell foam, and also fails to provide an even and stable polyol or polyol/monool mixture, or their premixes.

The polyol mixture contains the second polyoxyalkylene polyol (b) in an amount of 20–80%, preferably 30–60% by weight. When the polyol mixture contains the second polyol (b) in an amount of less than 30% by weight, it is difficult to prepare an even and stable polyol or polyol/monool mixture, or their premixes, whereas when the mixture contains the second polyol (b) in an amount of more than 80% by weight, an open cell foam is usually not obtained.

When the second polyoxyalkylene polyol (b) has a primary hydroxyl group content of more than 5% based on the total of the hydroxyl groups of the second polyol, an open cell foam is also not obtained usually.

The second polyoxyalkylene polyol (b) is used singly or as a mixture.

It is important from the practical standpoint that a premix prepared by addition of a catalyst, a foam stabilizer and a blowing agent to the polyol or polyol/monool mixture, as well as the polyol or polyol/monool mixture per se, are maintained even and stable at least for a period before it is used without separation of the ingredients. The polyol (b) is useful to maintain such a premix or, a polyol or polyol/monool mixture even and stable before its use since the polyol (a) is poor in miscibility with the polyol (c) or the monool (d) which will be set forth hereinafter.

The third polyoxyalkylene polyol (c) is other than the second polyoxyalkylene polyol (b) and has an average functionality of 2–6 and a hydroxyl value of 200–900 mg KOH/g. The third polyoxyalkylene polyol (c) is preferably a polyoxyalkylene polyol prepared by addition polymerization of an alkylene oxide preferably such as propylene oxide with a polyhydric alcohol having a functionality of 2–6. For the production of an open cell rigid foam for use as a structural material, in particular, there may be preferably used a polyoxyalkylene polyol prepared by addition polymerization of an alkylene oxide preferably such as propylene oxide with a polyhydric alcohol having a functionality of 3–6 so that the resultant polyol has a hydroxyl value of 250–550 mg KOH/g.

The polyhydric alcohol may be exemplified by propylene glycol, dipropylene glycol, glycerine, trimethylolpropane, pentaerythritol, diglycerine, methyl glucoside, sorbitol or sucrose. The polyhydric alcohol may be used singly or as a mixture.

The use of polyoxypropylene polyol produced by addition polymerization of propylene oxide with such a polyhydric alcohol as sorbitol or glycerine as the third polyol (c) is useful to prevent scorching or burning when a foam is produced.

The polyoxypropylene polyol (c) may be a polyester polyol or a low molecular weight glycol such as dipropylene glycol. A mixture of dipropylene glycol with a polyoxyalkylene polyol prepared by addition polymerization of an alkylene oxide such as propylene oxide to a polyhydric alcohol or an organic amine compound having an average functionality of 3–6 and having a hydroxyl value of 250–550 mg KOH/g is one of the preferred embodiments of the polyoxypropylene polyol (c).

When the third polyoxyalkylene polyol (c) has a hydroxyl value of less than 200 mg KOH/g, the resultant rigid foam is poor in mechanical strength, whereas when the third polyoxyalkylene polyol (c) has a hydroxyl value of more than 900 mg KOH/g, an excellent open cell foam is not obtained.

The mixture of polyols contains the third polyoxyalkylene polyol (c) in an amount of 0–60%, preferably 0–55%, and most preferably 5–50% by weight. When the polyol or polyol/monool mixture contains the third polyol (c) in an amount of more than 60% by weight, it is difficult to prepare an even and stable premix, and also to produce an excellent open cell foam.

The polyol mixture used in the invention comprises the first polyol (a) and the second polyol (b), and optionally the third polyol (c), which has weight proportion coordinates on a triangular diagram either on the sides of a hexagon or within the hexagon, as illustrated in FIG. 2, and which has a hydroxyl value in the range of 200–600 mg KOH/g, preferably in the range of 300–550 mg KOH/g. The use of the polyol mixture having a hydroxyl value more than 600 mg KOH/g fails to provide a foam with excellent open cells, whereas the use of the polyol mixture having a hydroxyl value less than 200 mg KOH/g fails to provide a foam having a mechanical strength sufficient for use as a structural material even if the foam has a high density.

According to the invention for the production of an open cell rigid polyurethane foam suitable for use as a shock absorbing material, it is preferred to use a mixture of polyols (a) and (b), and optionally (c), with a monool (d) having a hydroxyl value of 400–1800 mg KOH/g, wherein the total of the third polyoxyalkylene polyol (c) and the monool (d) is in the range of 5–60% by weight based on the polyol/monool mixture; and wherein the weight proportion coordinates of (a), (b), and (c)+(d) on a triangular diagram are either on the sides of a hexagon formed by connecting six points A, B, C, D, E and F with straight lines or within the hexagon, as illustrated in FIG. 3. It is further preferred that such a polyol/monool mixture has a hydroxyl value in the range of 200–600mg KOH/g.

When the monool (d) has a hydroxyl value of less than 400 mg KOH/g, there is obtained substantially no improvement in effective compressibility in the resultant rigid foam, whereas such a monool having a hydroxyl value of more than 1800 mg KOH/g does not exsist.

The monool (d) includes, for example, a lower aliphatic alcohol having 1–4 carbons such as methanol, ethanol or isopropyl alcohol; a glycol monoalkyl ether wherein the glycol has 2–5 carbons and the alkyl has 1–4 carbons such as monomethyl, monoethyl or monoisopropyl ether of ethylene glycol, propylene glycol, diethylene glycol or 1,4-butanediol; or an alkylene oxide adduct to an aliphatic alcohol having 1–10 carbons such as ethylene oxide, propylene oxide or butylene oxide adduct to 2-ethylhexyl alcohol. The monool may be used singly or as a mixture. Among these monools, ethylene glycol monomethyl ether or monoethyl ether is preferred.

Figure 4:
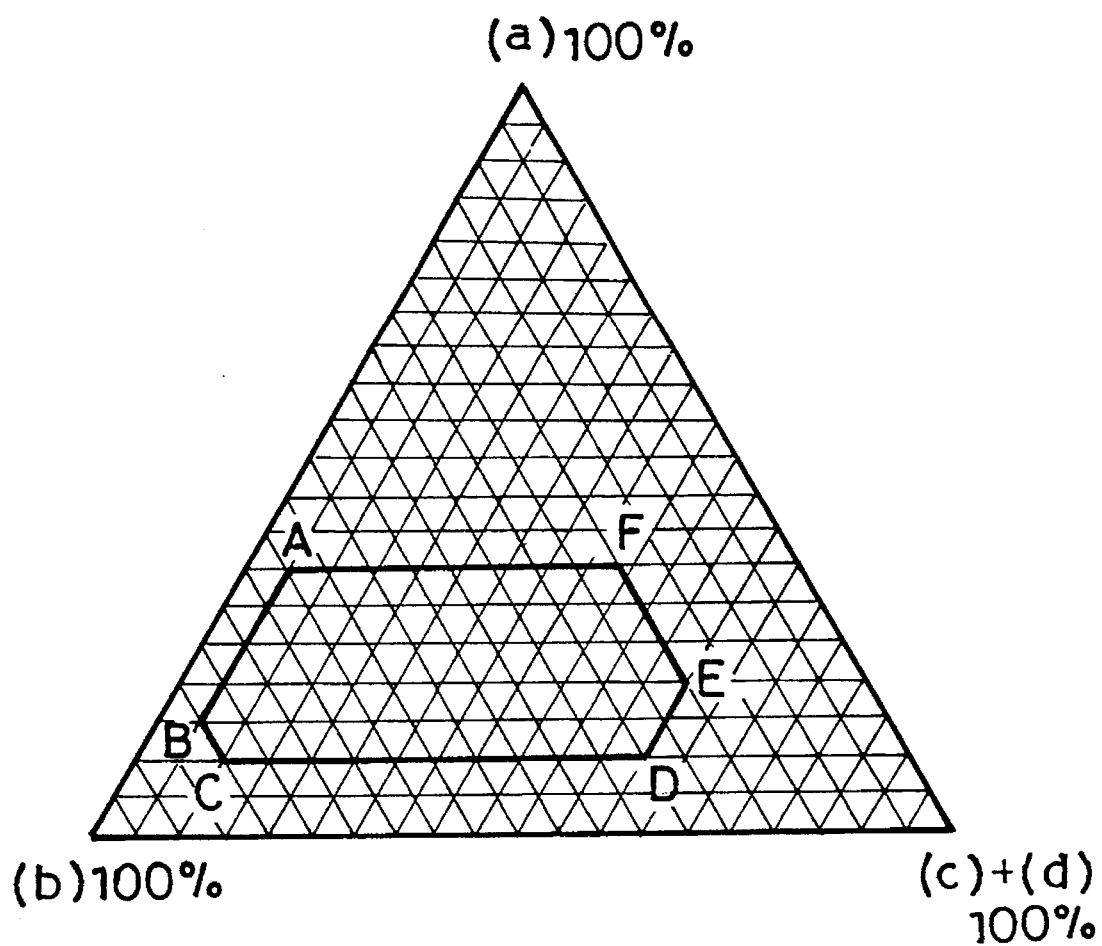
FIG. 4 is a triangular diagram on which a region of preferred weight proportion coordinates of polyols and monools used according to the invention for the production of an open cell rigid polyurethane foam suitable for use as a shock absorbing material are indicated.

For the production of an open cell rigid polyurethane foam suitable for use as a shock absorbing material, it is most preferred to use a polyol/monool mixture which comprises (a) 10–35% by weight of the first polyoxyalkylene polyol, (b) 20–80% by weight of the second polyoxyalkylene polyol, (c) 0–55% by weight of the third polyoxyalkylene polyol, preferably 5–50% by weight, and (d) 5–25% by weight of the monool, wherein the total of the third polyoxyalkylene polyol (c) and the monool (d) is in the range of 5–60% by weight based on the polyol/monool mixture; and wherein weight the proportion coordinates of the polyols and/monools, (a), (b) and, (c)+(d) on a triangular diagram are either on the sides of a hexagon formed by connecting six points A, B, C, D, E and F with straight lines or within the hexagon, as illustrated in FIG. 4. It is further preferred that the polyol/monool mixture has a hydroxyl value of 300–600 mg KOH/g. The use of this polyol/monool mixture most noticeably improves the effective compressibility of open cell rigid polyurethane foam.

When the content of the monool (d) is less than 5% by weight based on the polyol/monool mixture, the resultant foam is not noticeably improved in effective compressibility, whereas when the content of the monool (d) is more than 25% by weight, the resultant foam has a very small crosslinking degree, so that the foam has an undesirably reduced compressive srength. Cracks may be generated in the resultant foam.

The use of polyol/monool mixture having a hydroxyl value in the range of 300–550 mg KOH/g, particularly in the range of 400–550 mg KOH/g, is most preferred for the production of an open cell rigid polyurethane foam suitable for use as a shock absorbing material.

As set forth hereinbefore, the use of polyol/monool mixture having a hydroxyl value of more than 600 mg KOH/g fails to provide an excellent open cell foam, whereas the use of polyol/monool mixture having a hydroxyl value of less than 200 mg KOH/g fails to provide a foam having a mechanical strength sufficient for use as a shock absorbing material.

According to the invention, the reaction of the polyol mixture or polyol/monool mixture as set forth above with an organic polyisocyanate compound in the presence of water as the substantially sole blowing agent provides an open cell rigid polyurethane foam suitable for use as a heat insulating material, structural material or shock absorbing material.

It is preferred that the blowing agent consists essentially of water or water is used as the substantially sole blowing agent. The amount of water as a blowing agent is in the range of 0.5–5.5 parts by weight, preferably in the range of 1.0–4.5 parts by weight, in relation to 100 parts by weight of the mixture of polyols or plyol/monool. When the amount of water is too small, it is difficult to obtain an open cell rigid foam, and besides the resultant foam has an excessively high density, whereas when the amount of water is too much, the resultant foam has too low a density so that it is difficult to obtain a desirable 10%-compressive strength of not less than 1 kg/cm$^2$ even if the foam is produced by mold foaming.

If necessary, however, the blowing agent used may be a mixture of water and a volatile liquid such a halogenated hydrocarbon or a hydrocarbon such as pentane.

There may be used as a foam stabilizer, for example, an organopolysiloxane copolymer which is in conventional use for the production of a soft slab or a rigid foam, or for hot molding. The foam stabilizer used may include, for example, B-8404 or B-8017 available from Gold Schmidt, L-5410, L-5420, SZ-1127 or L-582 available from Nippon Unicar, SH-190, SH-192 or SH-193 available from Toray-Dow Corning, F-317, F-345, F-341 or F-242T available from Shinetsu Kagaku Kogyo K. K.).

The foam stabilizer may be used in an amount of 0.2–10 parts by weight, preferably 0.5–3 parts by weight relation to 100 parts by weight of the mixture of polyols or polyol/monool used.

The catalyst may be used in the production of open cell rigid polyurethane foam of the invention. Any catalyst may be used, such as an organic amine, tin or lead compound. Usually an amine compound is preferred, and a tertiary amine compound is most preferred. The tertiary amine compound includes, for example, tetramethylhexanediamine (TMHDA, available as KAORIZER NO. 1 (Kao K. K.) or TOYOCAT-MR (Toso K. K.)), pen tamethyldiethylenetriamine (PMDETA, available as KAORIZER NO. 3 (Kao K. K.)), dipropylene glycol solution of triethylenediamine (available as DABCO-33 LVC (Air Products)), or bis(2-dimethylaminoethyl)ether (available as TOYOCAT ET (Toso K. K.)). The catalyst may be used singly or as a mixture. Among these catalysts, a mixture of TMHDA/ bis(2-dimethylaminoethyl)ether (7/3), called TE-30, is particularly preferred in the invention. The catalyst may be used in an amount of 0.01–20% by weight based on the amount of polyisocyanate used.

An aromatic polyisocyanate is used as the organic polyisocyanate compound in the invention. The aromatic polyisocyanate is not specifically limited, however, polymethylene polyphenyl polyisocyanate, diphenylmethane diisocyanate, tolylene diisocyanate (TDI), crude tolylene diisocyanate, or their modified derivatives such as prepolymers, biurets, trimers, or carbodiimides are preferred from the standpoint of their reactivity and price.

Polymethylene polyphenyl polyisocyanate, also called crude MDI, C-MDI or polymeric MDI, is most preferred, in particular, having a viscosity of not more than 200 mPa. sec. (centipoise) at 25° C.

Polymethylene polyphenyl polyisocyanates as mentioned above are available as, for example, Luplanate H-20S having a viscosity of 180 mPa.sec. at 25° C. or Luplanate M-12S having a viscosity of 120 mPa.sec. at 25° C. (Takeda Badische Urethane Kogyo K. K.), Millionate MR-200 (Nippon Polyurethane K. K.), Sumidur 44V-20 or 44V-10 (Sumitomo Bayer), or PAPI- 135 (Mitsubishi Chemical Dow).

In the production of an open cell rigid polyurethane foam suitable for use as a shock absorbing material, the use of a mixture of polymethylene polyphenyl polyisocyanate with tolylene diisocyanate, crude tolylene diisocyanate, or their modified derivatives is preferred. The use of such a mixture renders the resultant foam more fragile, and hence renders the effective compressibility of foam larger.

Tolylene diisocyanate as above mentioned is available as, for example, Takenate 80, and crude tolylene diisocyanate, for example, as Takenate 4040C (either from Takeda Chemical Industries, Ltd.).

The polyisocyanate is reacted with the polyol or polyol/monool mixture at an isocyanate index of 70–150, preferably at 80–130. The use of too high an isocyanate index undesirably tends to form closed cells and also tends to be attended by scorching when foaming. On the contrary, the use of too low an isocyanate index provides a foam of a poor mechanical strength.

Any known additive such as a fire retardant, an antioxidant or a colorant may be used, if necessary. For instance, tris(chloropropyl)phosphate is preferably used as a fire retardant.

A viscosity reducing agent may also be used, if necessary, in a premix of the mixture of polyols or polyol/monool, such as propylene carbonate.

It is preferred that the open cell rigid polyurethane foam produced by the method of the invention has a density of 33–150 kg/m$^3$ when it is produced by free foaming. When the free foam has a density of less than 33 kg/m$^3$, it is poor in mechanical strength. A foam having a density of more than 150 kg/m$^3$ is practically useless since a foam is generally featured and useful by its low density or light weight.

As set forth above, the method of the invention provides an open cell rigid polyurethane foam suitable for use as a heat insulating material, structural material or shock absorbing material by use of a speified mixture of polyols or polyol/monool together with an aromatic polyisocyanate in the presence of water as the substantially sole blowing agent with no need of use of a volatile chlorofluorocarbon as a blowing agent.

In particular, the use of a specified polyol/monool mixture provides an open cell rigid polyurethane foam especially suitable for use as a shock absorbing material which has an effective compressibility of not less than 70%.

The invention will now be described in more detail with reference to examples and reference examples, however, the invention is not limited thereto.

The materials used in the examples and reference examples are as follows:

Polyol (a)

Polyol A: Addition product of propylene oxide to glycerine, having a hydroxyl value of 34 mg KOH/g, within the scope of the invention Polyol B: Addition product of propylene oxide to propylene glycol, having a hydroxyl value of 37 mg KOH/g, within the scope of the invention Polyol C: Addition product of propylene oxide to propylene glycol, having a hydroxyl value of 56 mg KOH/g, within the scope of the invention Polyol J: Addition product of propylene oxide to propylene glycol, having a hydroxyl value of 110 mg KOH/g, outside the scope of the invention Polyol K: Addition product of propylene oxide and then ethylene oxide each as blocks to glycerine, having a hydroxyl value of 35 mg KOH/g, an ethylene oxide unit content of 14% by weight, and a primary hydroxyl group content of 70%, outside the scope of the invention Polyol (b)

Polyol D: Addition product of propylene oxide to ethylenediamine, having a hydroxyl value of 500 mg KOH/g, within the scope of the invention Polyol E: Addition product of propylene oxide to ethylenediamine, having a hydroxyl value of 400 mg KOH/g, within the scope of the invention Polyol F: Addition product of propylene oxide to ethylenediamine, having a hydroxyl value of 300 mg KOH/g, within the scope of the invention Polyol G: Addition product of propylene oxide to a mixture of 2,4/2,6-tolylenediamine (80/20) and triethanolamine (having an average functionality of 3.6), having a hydroxyl value of 460 mg KOH/g, with in the scope of the invention Polyol I: Addition product of propylene oxide to monoethanolamine, having a hydroxyl value of 500 mg KOH/g, within the scope of the invention Polyol L: Addition product of propylene oxide (4 mols) and ethylene oxide (4.7 mols) to ethylenediamine (1 mol), having a hydroxyl value of 450 mg KOH/g, an ethylene oxide unit content of 41% by weight, and a primary hydroxyl group content of 70%, outside the scope of the invention Polyol (c)

Polyol H: Addition product of propylene oxide to a mixture of sorbitol and glycerine (having an average functionality of 4.5 ), having a hydroxyl value of 370 mg KOH/g, within the scope of the invention Polyol N: Addition product of propylene oxide to sorbitol, having a hydroxyl value of 500 mg KOH/g, within the scope of the invention Dipropylene glycol: having a hydroxyl value of 837 mg KOH/g, within the scope of the invention Ethylene glycol: having a hydroxyl value of 1810 mg KOH/g, with all the hydroxyl groups being primary hydroxyl groups, outside the scope of the invention Monool (d)

Monool M: Addition product of propylene oxide to 2-ethylhexyl alcohol, having a hydroxyl value of 56 mg KOH/g, within the scope of the invention Ethylene glycol monoethyl ether: having a hydroxyl value of 623 mg KOH/g, within the scope of the invention Abbreviations CT: The time (seconds) needed for the reaction mixture to become cream after the start of mixing the material GT: The time (seconds) needed for the reaction mixture to become viscous and have a gel strength after the start of mixing the material DPG: Dipropylene glycol EG: Ethylene glycol EE: Ethylene glycol monoethyl ether TCPP: Tris(chloropropyl)phosphate TE-30: Mixture of tetramethylhexanediamine (TMHDA))/bis(2-dimethylaminoethyl)ether (70/30)

Luplanate M-12S: Polymethylene polyphenyl polyisocyanate, having a viscosity of 120 mPa.sec. (centipoise) at 25° C., available from Takeda Badische Urethane Kogyo K. K.

Luplanate M-20S: Polymethylene polyphenyl polyisocyanate, having a viscosity of 180 mPa.sec. (centipoise) at 25° C., available from Takeda Badische Urethane Kogyo K. K.

Sumidur 44V-10: Polymethylene polyphenyl polyisocyanate, having a viscosity of 120 mPa.sec. (centipoise) at 25° C., available from Sumitomo Bayer Urethane K. K.)

Millionate MR-200: Polymethylene polyphenyl polyisocyanate, having a viscosity of 180 mPa.sec. (centipoise) at 25° C., available from Nippon Polyurethane K. K.)

Takenate 4040C: Crude tolylene diisocyanate available from Takeda Chemical Industries, Ltd.

Measurement of Properties of Foams

The measurement was carried out with the central portion of foam produced.

Compressive strength:

Compressive strength was measured along the rising direction of foam under compression of 10% unless specified otherwise. Compressive strength of foam for use as a shock absorbing material was indicated by the value of line A–B in FIG. 1, which was found to be roughly the same as 10%-compression strength.

Figure 1:
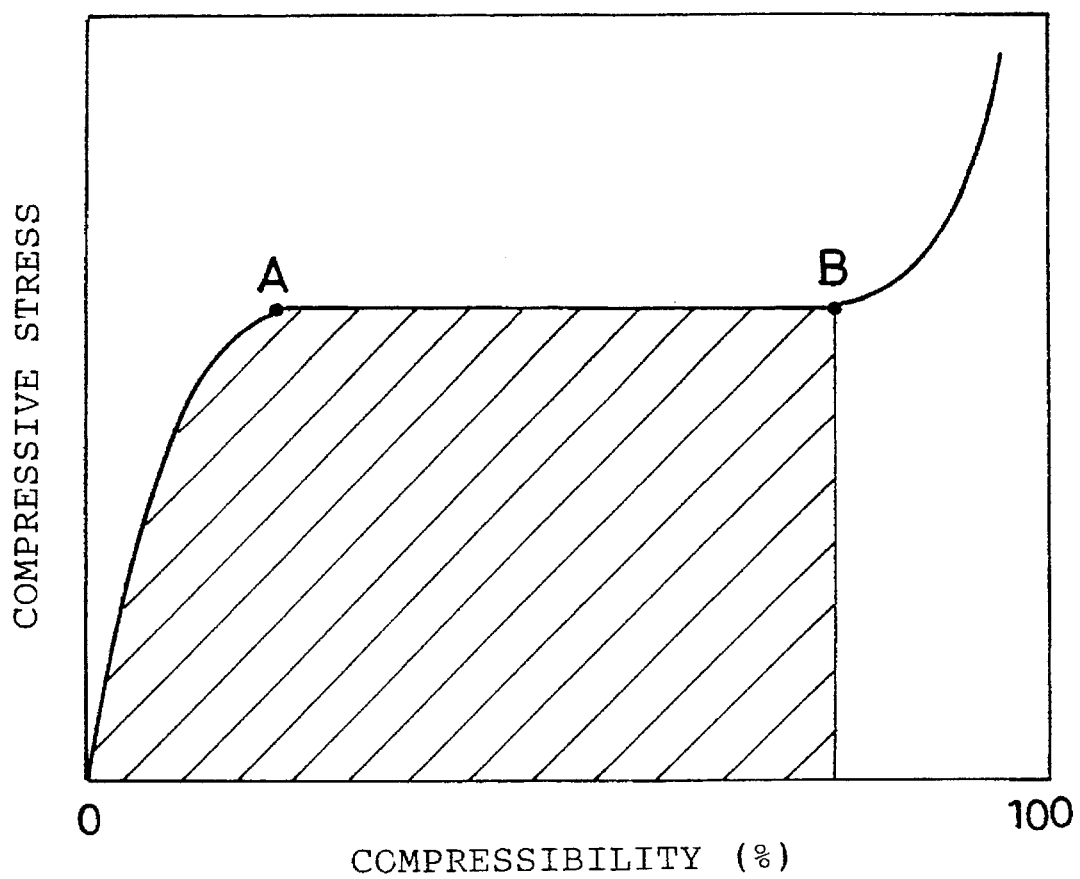
FIG. 1 is a simplified static compression test curve of a rigid polyurethane foam to illustrate the relationship between compressibility and compressive stress.

Effective compressibility:

Effective compressibility was indicated by the value of point B on the compression test curve in FIG. 1.

Dimensional stability:

Dimensional change of foam was measured between after standing for 24 hours at −30° C. and 80° C. When the change was not more than 1%, the dimensional stability was taken as "good".

EXAMPLE 1

A polyol, a foam stabilizer, water and a catalyst, each in an amount of three times (in terms of grams) as much as the amount indicated in Table 1, were mixed together to form a premix in a two liter capacity polyethylene beaker. The promix was found to be transparent and even.

The premix was adjusted at a temperature of 25° C., and an amount of three times as much as the amount of Luplanate M-12S indicated in Table 1 was weighed into the beaker. The premix and the polyisocyanate were immediately admixed at 3000–5000 rpm for five seconds to prepare a mixture. The mixture was poured into a 25 cm cubed wooden box having mold releasing paper attached inside the box, to prepare a free-foamed foam.

The density, closed open content, compressive strength, dimensional stability and appearance of cells of the resultant foam as well as the reactivity of foam are shown in Table 1. The method of the invention provides an open cell rigid polyurethane foam having a compressive strength of more than 1 kg/cm².

EXAMPLES 2–6 AND REFERENCE EXAMPLES 1–4

As indicated in Tables 1 and 2, a polyol mixture, a foam stabilizer, water and a catalyst, and optionally a fire retardant, were mixed together to form a premix. The mixture of polyols and the premix were found to be transparent and even.

In the same manner as in Example 1, the premix was mixed with the polyisocyanate and was formed into a free-foamed foam by a hand mixing foaming method. The density, closed open content, compressive strength, dimensional stability and appearance of cells of the resultant foam as Hell as the reactivity of foam are shown in Tables 1 and 2.

The method of the invention provides an open cell rigid polyurethane foam having a compressive strength of more than 1 kg/cm². However, the polyol (a) used in Reference Examples 1 and 2 were outside the scope of the invention, and the polyol (c) used in Reference Example 3 was outside the scope of the invention, and thus, the resultant foams were found to be substantially closed cell foams.

TABLE 1

|  |  | EXAMPLES | | | | | |
|---|---|---|---|---|---|---|---|
|  |  | 1 | 2 | 3 | 4 | 5 | 6 |
| FORMULATION (parts by weight) | | | | | | | |
| Polyol (a) | polyol A | 50 | 20 |  | 20 |  | 30 |
|  | polyol B |  |  | 40 |  |  |  |
|  | polyol C |  |  |  |  | 40 |  |
| Polyol (b) | polyol D |  |  |  | 60 |  | 30 |
|  | polyol E |  | 40 | 30 |  | 30 |  |
|  | polyol F | 30 |  |  | 12 |  |  |
|  | polyol G | 10 | 20 | 10 | 4 | 10 |  |
|  | polyol I |  |  |  |  | 20 |  |
| Polyol (c) | DPG | 10 | 20 | 20 | 4 |  | 20 |
|  | polyol H |  |  |  |  |  | 20 |
| (Hydroxyl value of |  | 235 | 424 | 348 | 403 | 288 | 402 |

TABLE 1-continued

|  | EXAMPLES | | | | | |
| --- | --- | --- | --- | --- | --- | --- |
|  | 1 | 2 | 3 | 4 | 5 | 6 |
| polyol mixture) (mg KOH/g) | | | | | | |
| B-8017 |  | 2.5 |  | 1.0 |  | 1.5 |
| SH-193 | 1.5 |  | 1.0 | 0.5 | 1.5 |  |
| TCPP |  |  | 10 | 10 | 10 | 10 |
| TE-30 | 0.5 | 0.2 | 0.5 | 0.4 | 0.5 | 0.8 |
| Water | 3.0 | 3.5 | 3.5 | 3.5 | 3.5 | 3.5 |
| Luplanate M-12S | 112 | 170 | 150 | 165 |  | 164 |
| Luplanate M-20S |  |  |  |  | 128 |  |
| (Isocyanate index) | 110 | 110 | 110 | 110 | 105 | 110 |
| REACTIVITY | | | | | | |
| CT (seconds) | 10 | 15 | 11 | 13 | 12 | 13 |
| GT (seconds) | 55 | 60 | 52 | 40 | 54 | 64 |
| PROPERTIES | | | | | | |
| Density (kg/m$^3$) | 40.0 | 45.0 | 43.0 | 45.0 | 44.2 | 42.2 |
| Closed cell content (%) | 2 | 3 | 0 | 3 | 5 | 2 |
| Compressive strength (kg/cm$^2$) | 1.35 | 1.76 | 1.20 | 2.34 | 1.35 | 2.28 |
| Dimensional stability | Good | Good | Good | Good | Good | Good |
| Appearance of cells*) | C' | F | C | M | C' | M |

Notes: *)F: fine; M: middle; C: coarse; C': slightly coarse

TABLE 2

|  |  | REFERENCE EXAMPLES | | | |
| --- | --- | --- | --- | --- | --- |
|  |  | 1 | 2 | 3 | 4 |
| FORMULATION (parts by weight) | | | | | |
| Polyol (a) | polyol B |  |  | 40 |  |
|  | polyol C |  |  |  | 15 |
|  | polyol H | 40 |  |  |  |
|  | polyol K |  | 30 |  |  |
| Polyol (b) | polyol D |  | 30 |  | 20 |
|  | polyol E | 20 |  |  |  |
|  | polyol G | 20 |  | 10 |  |
|  | polyol L |  |  | 30 |  |
| Polyol (c) | polyol H |  | 20 |  | 60 |
|  | DPG |  | 20 | 20 | 5 |
| (Hydroxyl value of polyol mixture) (mg KOH/g) |  | 383 | 402 | 363 | 372 |
| B-8017 |  |  | 1.5 |  | 1.5 |
| SH-193 |  | 1.5 |  | 1.0 |  |
| TCPP |  | 10 | 10 | 10 |  |
| TE-30 |  | 0.8 | 0.8 | 1.0 | 0.8 |
| Water |  | 3.5 | 3.5 | 3.5 | 3.0 |
| Luplanate M-12S |  | 159 | 164 |  |  |
| Luplanate M-20S |  |  |  | 154 | 161 |
| (Isocyanate index) |  | 110 | 110 | 110 | 120 |
| REACTIVITY | | | | | |
| CT (seconds) |  | 10 | 11 | 10 | 10 |
| GT (seconds) |  | 53 | 54 | 51 | 54 |
| PROPERTIES | | | | | |
| Density (kg/m$^3$) |  | 41.7 | 42.2 | 38.3 | 43.8 |
| Closed cell content (%) |  | 86 | 95 | 93 | 85 |
| Appearance of cells*) |  | F | F | M | F |

Notes: *)F: fine; M: middle; C: coarse; C': slightly coarse

REFERENCE EXAMPLES 5-7

The production of foam was tried by use of a polyol mixture as indicated in Table 3. However, any one of the polyol mixtures was found to get turbid, and there took place separation between the ingredients after a few days from the preparation. Such a polyol mixture was of no value in use at that time, and accordingly no further experiment was carried out.

The polyol (c) used in Reference Example 5 was outside the scope of the invention. The polyol mixture used in Reference Example 6 contained no polyol (b) but also the amount of polyol (c) used was beyond the scope of the invention, with being the same with Reference Example 7.

TABLE 3

|  |  | REFERENCE EXAMPLES | | |
| --- | --- | --- | --- | --- |
|  |  | 5 | 6 | 7 |
| Polyol (a) | polyol A | 50 | 30 | 10 |
| Polyol (b) | polyol F | 30 |  |  |
|  | polyol G | 10 |  | 30 |
| Polyol (c) | polyol H |  | 60 | 40 |
|  | EG | 10 |  |  |
|  | DPG |  | 10 | 20 |
| Hydroxyl value of polyol mixture (mg KOH/g) |  | 334 | 319 | 454 |

EXAMPLES 7-9 AND REFERENCE EXAMPLES 8

The relationship between the amount of water used as a blowing agent and the properties of the resultant foam was indicated in Table 4. Examples 7-9 provided an open cell rigid polyurethane foam. Reference Examples 8 in which water was used in excess provided an open cell rigid foam, however, the foam was found to have a small density and hardness, and hence was found to be unsuitable for use as a structural or shock absorbing material.

TABLE 4

| | | EXAMPLES | | | REFERENCE EXAMPLE |
|---|---|---|---|---|---|
| | | 7 | 8 | 9 | 8 |
| FORMULATIONS (parts by weight) | | | | | |
| Polyol (a) | polyol A | 20 | 20 | 20 | 20 |
| Polyol (b) | polyol E | 40 | 40 | 40 | 40 |
| | polyol G | 20 | 20 | 20 | 20 |
| Polyol (c) | DPG | 20 | 20 | 20 | 20 |
| (Hydroxyl value of polyol mixture) (mg KOH/g) | | 424 | 424 | 424 | 424 |
| TCPP | | 10 | 10 | 10 | 10 |
| B-8017 | | 0.5 | 0.5 | 0.5 | 1.5 |
| SH-193 | | 1.0 | 1.0 | 1.0 | |
| TE-30 | | 0.2 | 0.2 | 0.2 | 0.4 |
| Water | | 3.0 | 2.0 | 1.0 | 7.0 |
| Luplanate M-12S | | 162 | 145 | 129 | 207 |
| (Isocyanate index) | | 110 | 110 | 110 | 100 |
| REACTIVITY | | | | | |
| CT (seconds) | | 19 | 22 | 22 | 18 |
| GT (seconds) | | 68 | 75 | 80 | 56 |
| PROPERTIES | | | | | |
| Density (kg/m$^3$) | | 47.0 | 58.0 | 105.1 | 26.2 |
| Closed cell content (%) | | 0 | 0 | 0 | 0 |
| Compressive strength (kg/cm$^2$) | | 2.05 | 3.2 | 9.8 | 0.62 |
| Appearance of cells* | | C | C | M | C' |

Notes: *)F: fine; M: middle; C: coarse; C': slightly coarse

TABLE 5

| | | EXAMPLES | | | REFERENCE EXAMPLE | |
|---|---|---|---|---|---|---|
| | | 10 | 11 | 12 | 9 | 10 |
| FORMULATIONS (parts by weight) | | | | | | |
| Polyol (a) | polyol A | 20 | 20 | 20 | 20 | 20 |
| Polyol (b) | polyol E | 30 | 30 | 30 | 30 | 30 |
| | polyol G | 40 | 40 | 40 | 40 | 40 |
| Polyol (c) | DPG | 10 | 10 | 10 | 10 | 10 |
| (Hydroxyl value of polyol mixture) (mg KOH/g) | | 395 | 395 | 395 | 395 | 395 |
| TCPP | | 10 | 10 | 10 | 10 | 10 |
| B-8017 | | | 1.5 | | 1.0 | 1.0 |
| SH-193 | | 1.5 | | 1.5 | | |
| TE-30 | | 0.5 | 0.5 | 0.5 | 0.6 | 0.7 |
| Water | | 2.0 | 2.0 | 2.0 | 2.0 | 2.0 |
| Luplanate M-12S | | 138 | 125 | 113 | 75 | 250 |
| (Isocyanate index) | | 110 | 100 | 90 | 60 | 170 |
| REACTIVITY | | | | | | |
| CT (seconds) | | 10 | 13 | 15 | 14 | 8 |
| GT (seconds) | | 75 | 75 | 70 | 65 | 63 |
| PROPERTIES | | | | | | |
| Density (kg/m$^3$) | | 57.2 | 56.5 | 55.3 | 52.4 | 62.8 |
| Closed cell content (%) | | 0 | 0 | 0 | 34 | |
| Compressive strength (kg/cm$^2$) | | 1.92 | 1.47 | 1.25 | 0.68 | |
| Appearance of cells* | | C | F | C | F | |

Notes: *)F: fine; M: middle; C: coarse; C': slightly coarse

EXAMPLES 10–12 AND REFERENCE EXAMPLES 9 and 10

An open cell rigid polyurethane foam was produced by use of formulations as indicated in Table 5. The use of too small an isocyanate index as in Reference Example 9 provided a foam which was found to have a high density, but have a hardnes insufficient for a structural use. On the contrary, the use of too large an isocyanate index as in Reference Example 10 was attended by significant heat generation during foaming, and hence by remarkable scorching. The production of foam by use of such a formulation as above could not be commercially employed because of danger of fire.

EXAMPLES 13–18 AND REFERENCE EXAMPLES 11

These examples are to illustrate the production of an open cell rigid polyurethane foam particularly suitable for use as a shock absorbing material.

As illustrated in Tables 6 and 7, the use of polyols together with monools provides an open cell rigid polyurethane foam having an improved and high effective compressibility, especially by use of a monool having a high hydroxyl value. The use of monool in excess forms a mixture of polyol/ monool having a very large content of primary hydroxyl groups so that it fails to provide an excellent foam.

TABLE 6

| | | EXAMPLES | | | |
|---|---|---|---|---|---|
| | | 13 | 14 | 15 | 16 |
| FORMULATIONS (parts by weight) | | | | | |
| Polyol (a) | polyol A | 20 | 15 | 20 | 30 |
| | polyol B | | | | |
| Polyol (b) | polyol D | 40 | | 40 | |
| | polyol E | | 45 | | 20 |
| | polyol G | 15 | | 20 | 30 |
| Polyol (c) | polyol N | | 10 | | |
| | DPG | 5 | 10 | 10 | 10 |
| Monool (d) | EE | | 10 | 10 | 10 |
| | monool M | 20 | | | |
| (Hydroxyl value of polyol mixture) (mg KOH/g) | | 329 | 381 | 445 | 374 |
| F-317 | | 1.5 | | 1.5 | |
| F-345 | | | 1.5 | | 1.5 |
| SH-193 | | | | | |
| TCPP | | 20 | 20 | 20 | |
| TE-30 | | 0.2 | 0.2 | 0.2 | 0.2 |
| Water | | 3.6 | 1.8 | 3.6 | 3.0 |
| Sunidur 44V-10 | | 179 | 130 | 177 | |
| Millionate MR-200 | | | | | 95 |
| Takenate 4040C | | | | | 35 |
| (Isocyanate index) | | 110 | 110 | 110 | 100 |
| REACTIVITY | | | | | |
| CT (seconds) | | 20 | 20 | 18 | 15 |
| GT (seconds) | | 65 | 64 | 53 | 58 |

TABLE 6-continued

| | EXAMPLES | | | |
|---|---|---|---|---|
| | 13 | 14 | 15 | 16 |
| PROPERTIES | | | | |
| Density (kg/m³) | 42.8 | 78.2 | 45.6 | 49.5 |
| Closed cell content (%) | 0 | 0 | 0 | 0 |
| Compressive strength (kg/cm²) | 1.5 | 6.4 | 2.0 | 2.8 |
| Effective compressibility (%) | 58 | 78 | 86 | 85 |
| Dimensional stability | Good | Good | Good | Good |
| Average cell size (mm) | 1.0 | 2.0 | 1.5 | 2.0 |

TABLE 7

| | | EXAMPLES | | REFERENCE EXAMPLE |
|---|---|---|---|---|
| | | 17 | 18 | 11 |
| FORMULATIONS (parts by weight) | | | | |
| Polybl (a) | polyol A | | | 15 |
| | polyol B | 15 | 20 | |
| Polyol (b) | polyol D | 60 | | |
| | polyol E | | 25 | 45 |
| | polyol G | | 20 | |
| Polyol (c) | polyol N | | 10 | 10 |
| | DPG | 20 | 10 | |
| Monool (d) | EE | 5 | 15 | 30 |
| | monool M | | | |
| (Hydroxyl value of polyol mixture) (mg KOH/g) | | 504 | 426 | 422 |
| F-317 | | | | |
| F-345 | | 1.5 | | 1.5 |
| SH-193 | | | 1.5 | |
| TCPP | | 10 | 15 | 10 |
| TE-30 | | 0.3 | 0.3 | 0.2 |
| Water | | 3.0 | 3.0 | 1.7 |
| Sunidur 44V-10 | | 166 | | 140 |
| Millionate MR-200 | | | 162 | |
| Takenate 4040C | | | | |
| (Isocyanate index) | | 100 | 110 | 110 |
| REACTIVITY | | | | |
| CT (seconds) | | 18 | 18 | 20 |
| GT (seconds) | | 55 | 55 | 75 |
| PROPERTIES | | | | |
| Density (kg/m³) | | 51.4 | 52.4 | |
| Closed cell content (%) | | 0 | 0 | |
| Compressive strength (kg/cm²) | | 2.2 | 2.4 | |
| Effective compressibility (%) | | 584 | 75 | |
| Dimensional stability | | Good | Good | |
| Average cell size (mm) | | 4.0 | 1.0 | |

What is claimed is:

1. A method of producing an open cell rigid polyurethane foam which comprises reacting a polyol mixture comprising:

(a) 5–55% by weight of a first polyoxyalkylene polyol having an average functionality of 2–3.5, a hydroxyl value of 25–60 mg KOH/g, an oxyethylene unit content of not more than 5% by weight based on the first polyoxyalkylene polyol and a primary hydroxyl group content of not more than 5% based on the total of the hydroxyl groups of the first polyoxyalkylene polyol;

(b) 20–80% by weight of a second polyoxyalkylene polyol prepared by use of an organic polyfunctional amine compound as an initiator, having an average functionality of 3–5, a hydroxyl value of 150–800 mg KOH/g, and a primary hydroxyl group content of not more than 5% based on the total of the hydroxyl groups of the second polyoxyalkylene polyol; and (c) 0–60% by weight of a third polyoxyalkylene polyol other than the second polyoxyalkylene polyol, and having an average functionality of 2–6 and a hydroxyl value of 200–900 mg KOH/g;

wherein the weight proportion coordinates of the polyols (a), (b) and (c) on a triangular diagram are either on the sides of a hexagon formed by connecting six points A, B, C, D, E and F with straight lines or within the hexagon, as illustrated in FIG. 2; and having a hydroxyl value of 200–600 mg KOH/g; with an organic polyisocyanate at an isocyanate index of 70–150 in the presence of water as a blowing agent in an amount of 0.5–5.5 parts by weight in relation to 100 parts by weight of the polyol mixture.

2. The method as claimed in claim 1 wherein the polyoxyalkylene polyol (a) is an addition product of propylene oxide with a polyhydric alcohol as an initiator.

3. The method as claimed in claim 1 where in the polyoxyalkylene polyol (b) is an addition product of propylene oxide to at least one polyfunctional organic amine compound selected from the group consisting of a (poly)alkylene polyamine, an alkanolamine and a polyfunctional aromatic amine as an initiator.

4. The method as claimed in claim 1 wherein the polyoxyalkylene polyol (c) is a polyoxypropylene polyol having an average functionality of 3–6 and a hydroxyl value of 250–550 mg KOH/g.

5. The method as claimed in claim 1 wherein the polyoxyalkylene polyol (c) is dipropylene glycol.

6. The method as claimed in claim 1 wherein the polyoxyalkylene polyol (c) is a mixture of a polyoxypropylene polyol having an average functionality of 3–6 and a hydroxyl value of 250–550 mg KOH/g with dipropylene glycol.

7. The method as claimed in claim 1 wherein the organic polyisocyanate is polymethylene polyphenyl polyisocyanate.

8. A method of producing an open cell rigid polyurethane foam which comprises reacting a polyol/monool mixture comprising:

(a) 5–55% by weight of a first polyoxyalkylene polyol having an average functionality of 2–3.5, a hydroxyl value of 25–60 mg KOH/g, an oxyethylene unit content of not more than 5% by weight based on the first polyoxyalkylene polyol and a primary hydroxyl group content of not more than 5% based on the total of the hydroxyl groups of the first polyoxyalkylene polyol;

(b) 20–80% by weight of a second polyoxyalkylene polyol prepared by use of an organic polyfunctional amine compound as an initiator, having an average functionality of 3–5, a hydroxyl value of 150–800 mg KOH/g, and a primary hydroxyl group content of not more than 5% based on the total of the hydroxyl groups of the second polyoxyalkylene polyol;

(c) 0–55% by weight of a third polyoxyalkylene polyol other than the second polyoxyalkylene polyol, having an average functionality of 2–6 and a hydroxyl value of 200– 900 mg KOH/g; and (d) 5–25% by weight of a monool having a hydroxyl value of 400–1800 mg KOH/g;

wherein the total of the third polyoxyalkylene polyol (c) and the monool (d) is in the range of 5–60% by weight based on the mixture of polyol/monool; and wherein the weight proportion coordinates of the polyols and monools (a), (b) and, (c)+(d) on a triangular diagram are either on the sides of a hexagon formed by connecting six points A, B, C, D, E and F with straight lines or within the hexagon, as illustrated in FIG. 3; and having a hydroxyl value of 200–600 mg KOH/g; with an organic polyisocyanate at an isocyanate index of 70–150 in the presence of water as a blowing agent in an amount of 0.5–5.5 parts by weight in relation to 100 parts by weight of the mixture of polyol/monool.

9. The method as claimed in claim 8 wherein the polyoxyalkylene polyol (a) is an addition product of propylene oxide with a polyhydric alcohol as an initiator.

10. The method as claimed in claim 8 wherein the polyoxyalkylene polyol (b) is an addition product of propylene oxide with at least one organic amine compound having at least two active hydrogen atoms in the molecule selected from the group consisting of a (poly)alkylene polyamine, an alkanolamine and a polyfunctional aromatic amine as an initiator.

11. The method as claimed in claim 8 wherein the polyoxyalkylene polyol (c) is a polyoxypropylene polyol having an average functionality of 3–6 and a hydroxyl value of 250– 550 mg KOH/g.

12. The method as claimed in claim 8 wherein the polyoxyalkylene polyol (c) is dipropylene glycol.

13. The method as claimed in claim 8 wherein the polyoxyalkylene polyol (c) is a mixture of a polyoxypropylene polyol having an average functionality of 3–6 and a hydroxyl value of 250–550 mg KOH/g with dipropylene glycol.

14. The method as claimed in claim 8 wherein the monool (d) is an addition product of an alkylene oxide with an aliphatic alcohol having 1–10 carbons.

15. The method as claimed in claim 8 wherein the monool (d) is a monoalkyl ether of glycol of 2–5 carbons.

16. The method as claimed in claim 8 wherein the polyol/monool comprises:

(a) 10–35% by weight of the first polyoxyalkylene polyol;

(b) 20–80% by weight of the second polyoxyalkylene polyol;

(c) 0–55% by weight of the third polyoxyalkylene polyol; and (d) 5–25% by weight of the monool;

wherein the total of the third polyoxyalkylene polyol (c) and the monool (d) is in the range of 5–60% by weight based on the polyol/monool mixture; and wherein the weight proportion coordinates of the polyol/monool (a), (b) and, (c)+(d) on a triangular diagram are either on the sides of a hexagon formed by connecting six points A, B, C, D, E and F with straight lines or within the hexagon, as illustrated in FIG. 4; and having a hydroxyl value of 300–600 mg KOH/g.

17. The method as claimed in claim 16 wherein the polyol/monool mixture has a hydroxyl value of 300–550 mg KOH/g.

18. The method as claimed in claim 16 wherein the polyol/monool mixture has a hydroxyl value of 400–550 mg KOH/g.

19. The method as claimed in claim 8 wherein the organic polyisocyanate is polymethylene polyphenyl polyisocyanate.

20. The method as claimed in claim 8 wherein the aromatic polyisocyanate is a mixture of polymethylene polyphenyl polyisocyanate with at least one member selected from the group consisting of tolylene diisocyanate, crude tolylene diisocyanate, and their modified derivatives.

21. The method as claimed in claim 16 wherein the organic polyisocyanate is polymethylene polyphenyl polyisocyanate.

22. The method as claimed in claim 16 wherein the aromatic polyisocyanate is a mixture of polymethylene polyphenyl polyisocyanate with at least one member selected from the group consisting of tolylene diisocyanate, crude tolylene diisocyanate, and their modified derivatives.

* * * * *